Patented Dec. 2, 1941

2,264,811

UNITED STATES PATENT OFFICE 2,264,811

POLYMERIZATION OF CONJUGATED DIOLEFINIC HYDROCARBONS TO DRYING POLYMERS

Henry S. Rothrock, Wilmington, Del., assignor to E. I. du Pont de Nemours & Company, Wilmington, Del., a corporation of Delaware No Drawing. Application October 4, 1939, Serial No. 297,955

9 Claims. (Cl. 260—93)

This invention relates to the polymerization of aliphatic open-chain conjugated diolefinic hydrocarbons, such as butadiene and its homologs to form soluble, viscous, oily polymers possessing drying properties, and has particular reference to effecting the polymerization to drying polymer in the presence of a metallic sodium or similar catalyst. More particularly, the invention comprises a process for effecting relatively rapid polymerization of butadiene and its homologs to drying polymers under certain selected and correlated conditions of temperature, proportion of catalyst and dilution with an inert hydrocarbon solvent.

Previous efforts have been made to obtain synthetic products possessing the drying characteristics of the various naturally occurring siccative oils, such as linseed, soya bean, oiticica, China wood and the like. In such prior attempts it has been proposed to polymerize butadiene and its homologs by the use of metallic sodium and alkali metal catalysts. In some of these processes only caoutchouc-like materials are formed. In other methods using alkali metals as catalysts, it has been found necessary to immediately remove the polymerized products as soon as they are formed, the yields are extremely low, and the products are inferior, and at times contaminated with rubbery polymer. Furthermore, these prior methods with sodium or other alkali metal catalysts require a number of days to carry out the polymerization reaction.

This invention has as an object the provision of a method for obtaining drying polymers by the polymerization of aliphatic open-chain conjugated diolefinic hydrocarbons particularly butadiene and its homologs, in the presence of sodium or other alkali metal, or alkaline earth metal catalyst. Another object is to provide a method for transforming such aliphatic open-chain conjugated diolefinic hydrocarbons into drying polymers having excellent characteristics with respect to rate of drying and nature of films formed. A further object is to provide a method of obtaining such drying polymers in excellent yield and substantially free from the relatively useless or undesirable by-products frequently obtained by other methods. A still further object is to effect a relatively rapid polymerization of butadiene and its homologs to improved drying polymers. Another important object is to provide a method for polymerizing butadiene-butylene mixtures, which mixtures are readily obtainable from petroleum cracking processes. Other objects of the invention will appear hereinafter.

These objects are accomplished by subjecting an aliphatic open-chain conjugated, diolefin, particularly butadiene, in solvent quantities of an inert hydrocarbon to a temperature between 100° to 170° C. under pressure in the presence of appreciable quantities of a sodium or other catalyst from the group consisting of the alkali metal and alkaline earth metals. In the preferred embodiment of this invention a 20% to 40% solution of a hydrocarbon of the butadiene series, as butadiene, in a non-reactive hydrocarbon, as benzene, or a mixture of the saturated and unsaturated four carbon hydrocarbons in petroleum cracking processes, is subjected for a few hours to a temperature between 110° to 150° C., under pressure, in the presence of sodium in an amount approximating at least 4% to about 14% by weight of said butadiene hydrocarbon.

It is essential that appreciable quantities of the sodium or other catalyst be used in contrast to amounts of .3 to 1% of catalyst employed in prior methods wherein rubbery types of polymers are produced. The catalyst is desirably present in quantity approximating at least 4% to about 14% by weight of butadiene or other aliphatic open-chain conjugated diolefin employed in the polymerization reaction. Although metallic sodium, because of its low cost and ready availability, is the preferred catalyst for use in this invention, other alkali metal or alkaline earth metals may be used, such as lithium, potassium, calcium and the like. These metals may be used singly or as mixtures or alloys with one another. Or instead of the free metals, their hydrides may be used, such as sodium hydride which is particularly desirable for this use because of its ready availability in a fine state of division.

It is important that solvent quantities of a nonreactive hydrocarbon be used, that is, the diolefin should be diluted with at least equal parts or approximately 50% or more of a hydrocarbon which is substantially free from participation in the reaction. The diolefin or butadiene concentration of the solutions employed in the polymerization may preferably contain 20% to 40% diolefin or butadiene. As solvents, there may be employed benzene, one or more saturated or mono-olefinic aliphatic hydrocarbons, for example, a mixture of four carbon saturated and unsaturated aliphatic hydrocarbons obtained in petroleum cracking processes, or hydro-aromatic hydrocarbons, such as cyclohexane and cyclohexene. It is not desirable to use as solvents aromatic hydrocarbons having one or more aliphatic side chains attached to the aromatic nucleus, such as toluene, xylene and mesitylene. Such aromatic hydrocarbons having side chains condense with diolefins in the presence of alkali metals to form large quantities of alkylene substituted benzenes.

As the polymerizing temperature is one of the somewhat critical conditions essential to the process of this invention, it should be approximately between 100° to 170° C., and preferably between 110° to 150° C. to secure most successful results. The selected reaction temperature has a marked effect upon character of product and yields of drying polymer. Temperatures below 100° C. produce negligible quantities of drying polymers whereas temperatures above 170° C. produce a dark, gelled mass and substantially none of the desired drying polymer.

The method of this invention comprises the use of dilute solutions of butadiene, appreciable percentages of sodium or similar catalyst, preferably in amount at least 4% to about 14% by weight of butadiene, and a reaction temperature of at least 100° C. but not more than 170° C. The polymerization of butadiene to drying polymer in excellent yields is rapidly obtained by a proper correlation of temperature, amount of catalyst and dilution of butadiene with inert hydrocarbon solvent in accordance with the method of this invention.

The process of this invention is applicable to polymerize aliphatic open-chain conjugated diolefinic hydrocarbons, particularly a hydrocarbon of the butadiene series. For example, the diolefinic constituent may be butadiene or various open-chain homologs of butadiene, such as isoprene, a-methyl butadiene (piperylene), or 2,3-dimethyl butadiene. These butadiene hydrocarbons may be employed alone or in mixture with butadiene or with each other.

Such homologs of butadiene, which are equivalents for butadiene in the present invention, are therefore comprehended within the meaning of the term a conjugated butadiene as used herein.

Also there may be used in this invention butadiene-olefin and butadiene-containing aliphatic hydrocarbon mixtures, such as can be separated from the low boiling constituents produced in the cracking of petroleum hydrocarbons. By fractionation of these low boiling constituents there are obtained fractions containing butadiene, the quantity of butadiene varying with the accuracy of the fractionation and with the particular type of cracking process used. Such fractions represent a cheap source of butadiene and consist of butadiene mixed with other saturated and unsaturated hydrocarbons of closely similar boiling points. As the isolation of butadiene from such mixtures is a tedious and expensive process, it is desirable to use the mixtures without further treatment.

The invention is illustrated by the following examples in which parts are by weight unless otherwise specified.

*Example I*

A pressure bomb is loaded with 35 parts butadiene, 105 parts benzene, and 5 parts metallic sodium, placed in a shaker rack and heated for 3 hours at 110° C. The bomb is then cooled, and the reaction product filtered through a kieselguhr filter-aid, such as "filtercel" to remove sodium. To the filtrate is then added 7.5 parts ethyl alcohol and 4 parts activated charcoal, after which this mixture is heated for 30 minutes at steam bath temperature, and again filtered through "filtercel."

Volatile material is then evaporated from the filtrate on a water bath, leaving 33 parts of a deep red, viscous, oily polymer. This polymer, which has an iodine number of approximately 400, is readily soluble in organic hydrocarbon solvents; such as, petroleum ether, toluene, xylene, benzene, mineral spirits and the like.

Films from solutions of proper concentrations of these drying polymers on a suitable support dry in a few hours at ordinary temperatures to clear, colorless, glossy coatings which are hard tough, adherent, and of excellent resistance to attack by chemical reagents. The drying is hastened by the use of elevated temperatures, by the use of the various drying accelerators; such as the linoleates, or naphthenates of lead, manganese or cobalt ordinarily employed for the natural drying oils, or by the use of a combination of these drying accelerators and elevated temperatures.

*Example II*

When 150 parts of a butylene-butadiene mixture containing 32% butadiene and 5 parts sodium metal are subjected to the treatment described in Example I except that the heating is carried out for 4 hours at 140° C., there is obtained a 75% yield (based on butadiene) of polymer similar in properties with that of the first example. The term butylene as used herein refers to a mixture of four carbon hydrocarbons, for example, 1-butene, 2-butene, n-butane, 2-methyl propane, 2-methyl propene-1, which are obtained in addition to butadiene in petroleum cracking processes.

*Example III*

When a mixture of 25 parts benzene, 125 parts butylene-butadiene solution containing 32% butadiene, and 5 parts sodium is treated as described in Example II, there is obtained an 85% yield (based on butadiene) of polymer similar in properties to that of Example I. As illustrative of the critical effect of temperature on this reaction, a mixture of 35 parts of benzene, 125 parts of butylene-butadiene solution containing 32% of butadiene, and 5 parts of sodium heated for 5 hours at 100° C. in a closed vessel as in Example I, yields only 5% of drying polymer. A similar reaction carried out at 90° C. gives only a negligible yield of drying polymer.

*Example IV*

When 25 parts of butadiene, 150 parts benzene, and 1 part sodium are heated for 1½ hours at 110° C. and treated as described in Example I, there is obtained a 76% yield (based on butadiene) of drying polymer.

*Example V*

When 40 parts butadiene, 80 parts benzene, and 5 parts of sodium hydride are heated for 3 hours at 120° C., and treated as described in Example I there is obtained a 77.5% yield (based on butadiene) of drying polymer similar in characteristics to that obtained by the procedure of Example I.

It is preferable to carry out the polymerization under the pressure exerted by the reaction components at the temperature employed. However, higher pressures may be employed and these higher pressures may be obtained by having present under pressure another gas such as nitrogen, hydrogen, methane, ethane, ethylene, or the like. When carrying out the invention according to the preferred method, using a sodium catalyst with a 20% to 40% concentration of butadiene and a temperature of 110° to 150° C., the polymerization reaction will generally be complete in 5 hours or less.

In addition to the use of an inert solvent, it is sometimes desirable to introduce small quantities of materials which may be reactive under the conditions employed for the polymerization, and in many cases it is possible thus to effect some modification in the properties of the butadiene drying polymers. Among the materials which may be employed in small proportion for this purpose are indene, dihydronaphthalene, chloroprene, styrene, vinyl acetate, methyl methacrylate, and other unsaturated compounds. Cyclic diolefins, such as cyclopentadiene and cyclohexadiene may also be employed in small proportions with butadiene.

To recover the drying polymer the crude reaction product may be filtered, preferably through some absorbent agent such as "filtercel." Before filtration, it may be desirable to add more solvent to the crude reaction product. From the filtrate there is evaporated (under vacuum if desired) the volatile material to yield the non-volatile, viscous polymer as a residue. It is preferable that the boiling point of the hydrocarbon or hydrocarbons employed as solvent be sufficiently low to permit ready removal during the purification of the product.

Alternatively the filtrate may be treated with a small amount of alcohol or with water or with dilute acid solutions, heated for a few minutes with activated charcoal, and then refiltered prior to the evaporation of the volatile material from the filtrate. This alternative treatment generally results in a somewhat lighter colored and more rapid drying product. The color of the product is also improved if air is carefully excluded until after the treatment with alcohol, water, or acid.

The synthetic drying polymers prepared from butadiene or other aliphatic open-chain conjugated diolefinic hydrocarbons in accordance with the method of this invention may be utilized for the various decorative and protective purposes for which drying oils or vehicles of a drying nature are commonly employed. A solution of the drying polymer may be employed directly as a clear varnish or lacquer. For example, steel panels may be brushed or sprayed in the customary manner with a solution of the polymer in an appropriate hydrocarbon solvent, such as xylene or mineral spirits.

Such films show good drying characteristics and dry rapidly at ordinary or elevated temperatures, and even more rapidly if there is present a small amount ($\frac{1}{10}$ to $\frac{3}{10}$ per cent based on the weight of polymer present) of the customary drying accelerators, such as the naphthenates or linoleates of cobalt, lead or manganese. The coatings obtained are smooth, glossy, clear, colorless, hard and adherent. They show no indications of cracking or loss of adhesion when the metal support is bent, and are remarkably resistant to the action of acids, alkalis, and of water or of other solvents. Outdoor exposures have shown that the coatings possess good durability characteristics. Solutions of the drying polymer in suitable solvents may be applied to other surfaces, such as wood or over various base coats. Such coatings possess excellent gloss, adhesion and durability.

Solutions of the drying polymer are particularly suitable for uses which involve baking at relatively high temperatures around 200° C., for instance. Drying is very rapid under these conditions, particularly in thin films, and there are formed hard, chemically resistant coatings which possess considerable flexibility. Thus, the solutions of the drying polymer are especially suitable for coating the interior of food cans, beverage containers and the like.

For such purposes the polymers may serve particularly well when employed as undercoats in conjunction with other top-coating materials. When a vinyl chloride-vinyl acetate interpolymer is employed as a top coat, it may be desirable to incorporate with the solution of butadiene polymer a small proportion, e. g., 1% to 10% of a methacrylic acid ester, such as isobutyl methacrylate, in order to promote superior adhesion to the top coat.

Solutions of the drying polymer may also be used as vehicles for the preparation of enamels. For example, 100 parts of a 60% solution of the drying polymer from butadiene in mineral spirits is ground with 75 parts of titanium dioxide to produce an enamel of excellent whiteness and hiding power. This enamel coating may be air dried or baked, yielding a smooth, glossy, coating of desirable appearance and durability. A black enamel having similar desirable properties is prepared by grinding together 100 parts of the drying oil polymer solution and 7 parts of carbon black.

The rapid accomplishment of the polymerization to drying polymer by the method of this invention is one of its important advantages. This rapidity with which the polymerization is effected constitutes a decided improvement over prior methods. With this invention it is possible to effect practically complete polymerization of butadiene to a drying polymer in a few hours time, whereas prior methods require 3 days or more. Furthermore this invention does not require careful control of the course of the polymerization in order to stop the reaction prior to occurrence of solid products as in prior methods. Another important advantage of this invention is the formation of high yields of drying polymer by polymerizing butylene which is readily available at low cost from the petroleum industry.

The use of appreciable amounts of catalyst in this invention is one of the important features for securing soluble drying polymers from diolefins and involves no undue expense since most of the catalyst may readily be recovered for reuse from the soluble reaction products at the conclusion of the polymerization. In prior methods where small amounts of catalysts are used there may be considerable loss of catalysts and frequently chemical means are necessary to remove the finely divided sodium from the rubbery reaction products formed in such prior methods. Another advantage of this invention is the high yields of improved drying polymers and substantial absence of solid or rubbery polymer in the reaction product.

As many apparently widely different embodiments this invention may be made without departing from the spirit and scope thereof, it is to be understood that I do not limit myself to the specific embodiments thereof, except as defined in the appended claims.

I claim:

1. A process for rapidly polymerizing a conjugated butadiene to drying polymers which comprises subjecting a concentration of 20 to 50% of said conjugated butadiene in an inert hydrocarbon solvent to a temperature of 110° to 170° C. under pressure in the presence of a catalyst selected from the group consisting of the alkali metals, the alkali metal hydrides and the alkaline earth metals, said catalyst being present in an amount approximating at least 4% to about 14% by weight of said conjugated butadiene.

2. The process set forth in claim 1 in which said catalyst is metallic sodium.

3. The process set forth in claim 1 in which said catalyst is sodium hydride.

4. A process for rapidly polymerizing a conjugated butadiene to drying polymers which comprises subjecting a concentration of 20 to 50% of said conjugated butadiene in butylene to a temperature of 110° to 170° C. under pressure in the presence of a catalyst selected from the group consisting of the alkali metals, the alkali metal hydrides and the alkaline earth metals, said catalyst being present in an amount approximating at least 4% to about 14% by weight of said conjugated butadiene.

5. The process set forth in claim 4 in which said catalyst is metallic sodium.

6. The process set forth in claim 4 in which said catalyst is sodium hydride.

7. A process for rapidly polymerizing a conjugated butadiene to drying polymers which comprises subjecting a mixture of aliphatic hydrocarbons derived from the cracking of petroleum and containing 20 to 50% of a conjugated butadiene in said aliphatic hydrocarbons to a temperature of 110° to 170° C. under pressure in the presence of a catalyst selected from the group consisting of the alkali metals, the alkali metal hydrides and the alkaline earth metals, said catalyst being present in an amount approximating at least 4% to about 14% by weight of said conjugated butadiene.

8. A process for rapidly polymerizing a conjugated butadiene to drying polymers which comprises subjecting a butadiene-olefin mixture separated from the low boiling constituents produced in the cracking of petroleum hydrocarbons and containing 20 to 50% of a conjugated butadiene in said olefin mixture to a temperature of 110° to 170° C. under pressure in the presence of a catalyst selected from the group consisting of the alkali metals, the alkali metal hydrides and the alkaline earth metals, said catalyst being present in an amount approximating at least 4% to about 14% by weight of said conjugated butadiene.

9. A process for rapidly polymerizing a conjugated butadiene to drying polymers which comprises subjecting a concentration of 20 to 50% of said conjugated butadiene in a mixture of saturated and unsaturated four carbon hydrocarbons derived from the cracking of petroleum hydrocarbons to a temperature of 110° to 170° C. under pressure in the presence of a catalyst selected from the group consisting of the alkali metals, the alkali metal hydrides and the alkaline earth metals, said catalyst being present in an amount approximating at least 4% to about 14% by weight of said conjugated butadiene.

HENRY S. ROTHROCK.